United States Patent
Lang et al.

(10) Patent No.: US 11,745,683 B2
(45) Date of Patent: Sep. 5, 2023

(54) METHOD FOR DETECTING A COLLISION DIRECTION OF A VEHICLE, METHOD FOR ACTIVATING A COLLISION PROTECTION SYSTEM OF A VEHICLE IN RESPONSE TO A DETECTED COLLISION DIRECTION OF THE VEHICLE, DEVICE, AND VEHICLE

(71) Applicant: Robert Bosch GmbH, Stuttgart (DE)

(72) Inventors: Gunther Lang, Stuttgart (DE); Ivo Kahle, Sachsenheim (DE); Michael Schmid, Kornwestheim (DE); Marcus Gross, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/907,780

(22) PCT Filed: Mar. 10, 2021

(86) PCT No.: PCT/EP2021/056019
§ 371 (c)(1),
(2) Date: Aug. 29, 2022

(87) PCT Pub. No.: WO2021/219284
PCT Pub. Date: Nov. 4, 2021

(65) Prior Publication Data
US 2023/0111422 A1 Apr. 13, 2023

(30) Foreign Application Priority Data
Apr. 30, 2020 (DE) .................. 10 2020 205 488.6

(51) Int. Cl.
*B60R 21/0132* (2006.01)

(52) U.S. Cl.
CPC ............... *B60R 21/0132* (2013.01)

(58) Field of Classification Search
CPC ................................................ B60R 21/0132
See application file for complete search history.

(56) References Cited

U.S. PATENT DOCUMENTS

2013/0289828 A1   10/2013   Takeuchi

FOREIGN PATENT DOCUMENTS

DE   102009000516 A1   8/2010
DE   102011086006 A1   5/2013

(Continued)

OTHER PUBLICATIONS

International Search Report for PCT/EP2021/056019, dated Jun. 17, 2021.

*Primary Examiner* — Mathew Franklin Gordon
(74) *Attorney, Agent, or Firm* — NORTON ROSE FULBRIGHT US LLP; Gerard Messina (57) ABSTRACT

A method for detecting a direction of a collision of a vehicle. The method includes a comparing step, in which a first acceleration signal is compared to two threshold values, in order to determine a first collision direction signal indicating a direction of the collision, and in which a second acceleration signal is compared to a further threshold value, in order to determine a further collision direction signal indicating a direction of the collision. The second acceleration signal represents the acceleration of the vehicle subjected to smoothing. In the determining step, using the first collision direction signal and the further collision direction signal, a result signal is determined, which indicates the direction indicated by the first collision direction signal and by the further collision direction signal as an actual collision direction.

15 Claims, 6 Drawing Sheets

(56) References Cited

FOREIGN PATENT DOCUMENTS

| | | |
|---|---|---|
| DE | 112014006344 T5 | 11/2016 |
| DE | 102017202534 A1 | 8/2018 |
| WO | 2011069939 A1 | 6/2011 |

METHOD FOR DETECTING A COLLISION DIRECTION OF A VEHICLE, METHOD FOR ACTIVATING A COLLISION PROTECTION SYSTEM OF A VEHICLE IN RESPONSE TO A DETECTED COLLISION DIRECTION OF THE VEHICLE, DEVICE, AND VEHICLE

FIELD

The present invention relates to a device and a method for detecting a collision direction of a vehicle, and for. The present invention also includes a computer program.

BACKGROUND INFORMATION

In order to detect a collision of a vehicle with a collision object, such as another vehicle, sensor signals of the vehicle may be evaluated. In response to a detected collision, collision protection systems of the vehicle, such as an airbag, may then be activated. The detection of vehicle crashes in airbag control units is based, for example, on information from acceleration and/or pressure sensors installed in the vehicle. The measured signals of these sensors are processed (e.g., filtered or integrated) and compared to triggering thresholds, in order to arrive at a triggering decision. In this context, the separate detection algorithms for head-on and rear-end crashes are based on the centrally measured x-acceleration, that is, the acceleration along the longitudinal axis of the vehicle.

SUMMARY

Using the approach according to the present invention, a method for detecting a collision direction of a vehicle, a method for activating a collision protection system of a vehicle in response to a detected collision direction of the vehicle, in addition, a device that uses these methods, a vehicle including the device, and finally, a corresponding computer program, are provided. Advantageous further refinements and improvements of the basic device of the present invention are disclosed herein.

Using the present invention, it is possible to detect a current collision direction reliably. In this context, with regard to the direction of travel of the vehicle, it is possible to consider two longitudinal collision directions as substantially identical without favoring one collision direction, such as the head-on one. This is advantageous, for example, in a vehicle having passenger positions situated specularly symmetrically, as in the case of a robotaxi. The detection of collision direction put forward here is also dynamic, and a currently detected collision direction may be verified and possibly changed, as well, which is advantageous, in particular, in the case of a multiple collision, such as a head-on crash followed by a rear-end collision.

According to the present invention, a method for detecting a collision direction of a vehicle is provided. According to an example embodiment of the present invention, the method includes a step of comparing a first acceleration signal to a first threshold value and to a second threshold value, a step of comparing a second acceleration signal to a further threshold value, and a step of determining a result signal. In the step of comparing the first acceleration signal to the first threshold value and to the second threshold value, the first acceleration signal represents a longitudinal acceleration of the vehicle. The first threshold value and the second threshold value have different algebraic signs, in order to be able to distinguish between two opposite directions of the collision. The comparison is made, in order to determine a first collision direction signal indicating a direction of the collision. In the step of comparing the second acceleration signal to the further threshold value, the second acceleration signal represents the acceleration of the vehicle subjected to smoothing. In addition, the comparison is made, in order to determine a further collision direction signal indicating a direction of the collision. In the determining step, the result signal is determined, using the first collision direction signal and the further collision direction signal. The result signal then indicates the direction indicated by the first collision direction signal and the further collision direction signal as an actual collision direction, if the direction of the collision of the first collision direction signal and the direction of the collision of the further collision direction signal match.

The vehicle may be, for example, a motor vehicle, a cargo truck, or a rail car. In addition, the vehicle may operate in a semiautomated or fully automated manner. The collision direction may run along the direction of travel. It may be identified as the actual and/or current collision direction, for example, a head-on collision or rear-end collision. The first acceleration signal may be, for example, a current acceleration of the vehicle measured with the aid of an acceleration sensor of the vehicle. The first acceleration signal may be smoothed, in order to provide the second acceleration signal, for example, in order to obtain a stronger low-pass characteristic for the second acceleration signal. The first and the second threshold values may be different from zero and, optionally, equal in magnitude. In addition, the first and second threshold values may represent a detection threshold for detecting a collision; the exceedance or undershooting of the threshold value indicating the collision as a function of the algebraic sign of the threshold value. To provide the collision direction signal, the direction of the collision may be derived from the algebraic sign of the threshold values. The further threshold value may be zero, for example. The direction of the collision may then be derived, for example, using the exceedance or undershooting of the further threshold value.

According to one specific embodiment of the present invention, the method may include a step of supplying the result signal via a single electrical line. In this context, the result signal includes the detected, current collision direction of two opposite collision directions. In this manner, it is advantageously possible to use a switch having an output, in order to supply the result signal via the one electrical line. In addition, separate evaluation circuits for the two directions are not necessary.

According to one specific embodiment of the present invention, the steps of the method may be executed repeatedly, in order to detect a change in the actual collision direction during the collision and to indicate it, using the result signal. This advantageously allows dynamic detection of the collision direction and, due to this, rapid switching-over in response to a changing collision direction, for example, in the case of a multiple collision, in order to activate, for example, vehicle components or driving systems in a direction-specific manner, as described below.

According to one specific embodiment of the present invention, the method may also include a step of reading in the first acceleration signal via an interface to an acceleration sensor. The first acceleration signal may include, for example, raw sensor data or be a signal that is already processed, for example, lowpass-filtered.

In addition, according to one specific embodiment of the present invention, the second acceleration signal may also be read in in the reading-in step. As an alternative to that, the method may also include a step of smoothing the first acceleration signal. In the smoothing step, the second acceleration signal may be ascertained, using low-pass filtering of the first acceleration signal. This advantageously supports detection, for example, in the case of marked oscillation of the first acceleration signal.

In the step of comparing the first acceleration signal, the first collision direction signal may have a similar hysteresis irrespective of the direction of the collision. Consequently, first-time, short-term exceedance or undershooting of the first or second threshold value, that is, a short-term upswing or downswing of the first acceleration signal below the first or second threshold value, may remain without an effect on the detected collision direction. This advantageously increases a robustness of the detection of the collision direction. The similar hysteresis is advantageous for rendering symmetric detection of collision direction possible, where none of the two opposite collision directions is favored, which is advantageous, for example, when using the method in connection with a vehicle having occupant positions situated specularly symmetrically.

In this context, a period of time of the hysteresis may be started, when a magnitude of the first acceleration signal falls below the first threshold value or the second threshold value, and not started, when the magnitude of the first acceleration signal rises above the first threshold value or the second threshold value. In this manner, a first-time exceedance in magnitude of one of the threshold values may be used immediately for detecting the collision direction. However, subsequent undershooting in magnitude may only result in a change of the detected collision direction, if the undershooting continues during the period of time of the hysteresis.

Furthermore, according to one specific embodiment of the present invention, the result signal may be determined in the determining step, using, in addition, at least one sensor signal. The sensor signal may represent a signal provided by a peripheral sensor of the vehicle. To that end, the sensor signal may be read in, for example, via an interface to a distance sensor device of the vehicle, or via an interface to a sensor device situated in a deformation region of the vehicle, for example, a sensor in a front or rear region of the vehicle. This may advantageously increase the reliability of the collision direction detection.

According to one specific embodiment of the present invention, a collision start signal, which represents a detected collision, may additionally be determined in the step of comparing the first acceleration signal. To that end, the collision start signal may be determined, for example, by comparing the magnitude of the first acceleration signal to the first threshold value and to the second threshold value. In addition, the first threshold value and the second threshold value may have a magnitude, which exceeds a predefined limiting value. Consequently, it is advantageously possible to measure the start of the collision, as well, in addition to the collision direction.

A method for activating a collision protection system of a vehicle in response to a detected collision direction of the vehicle is additionally provide. In this context, the collision protection system includes at least one subsystem having at least one first collision protection device assigned to a first collision direction and at least one second collision protection device assigned to a second collision direction. The method includes a reading-in step and a determining step. In the reading-in step, a result signal, which indicates the detected collision direction, is read in. To that end, in one specific embodiment of the above-described method for detecting a collision direction of a vehicle, the result signal is determined. In the determining step, a control signal for selectively activating the first collision protection device or the second collision protection device is determined, using the result signal. In this manner, direction-specific activation of collision protection devices is advantageously enabled.

To that end, according to one specific embodiment of the present invention, in the determining step, the control signal is determined for activating the first collision protection device, if the result signal indicates the first collision direction, and determined for activating the second collision protection device, if the result signal indicates the second collision direction. In this manner, it is possible, for example, to change the activation of the collision protection devices, as well, in response to a detected change of collision direction, in order to activate, e.g., a belt tensioner or an airbag in a directionally specific manner.

According to one specific embodiment of the present invention, the method may also include a step of selecting the subsystem of the collision protection system having the first collision protection device and the second collision protection device.

The subsystem may be selected, using a third acceleration signal. The third acceleration signal may represent a magnitude of the first acceleration signal. Consequently, during the selection of the subsystem, for example, a category of the collision protection system may be selected, in order to select a particular category or group of collision protection devices as a function of the detected collision direction. For example, an airbag system or a system for activating a belt tensioner may be selected as a subsystem. Activation of not only individual collision protection devices, but also a category or group of collision protection devices is advantageous, for example, in order to activate all of the belt tensioners during a collision, whereas a selection of airbags may be made in a directionally specific manner. To that end, the selecting step may be carried out prior to or simultaneously to the determining step.

This method may be implemented, for example, as software or hardware or as a mixture of software and hardware, in, for example, a control unit.

The present invention further provides a device, which is configured to perform, control and/or implement, in corresponding devices, the steps of a variant of the methods put forward here. The object of the present invention may be achieved quickly and efficiently by this embodiment variant of the invention in the form of a device, as well.

According to an example embodiment of the present invention, the device may include at least one processing unit for processing signals or data, at least one storage unit for storing signals or data, at least one interface to a sensor or to an actuator for reading in sensor signals from the sensor or for outputting data signals or control signals to the actuator, and/or at least one communications interface for reading in or outputting data, which are embedded in a communications protocol. The processing unit may be, for example, a signal processor, a microcontroller or the like; the storage unit being able to be a flash memory, an EEPROM or a magnetic storage unit. The communications interface may be configured to read in or output data wirelessly and/or by wire; a communications interface, which is able to read in or output the data transmitted by wire, being able to read in these data, e.g., electrically or optically, from a corresponding data transmission line, or to output them to a corresponding data transmission line.

In the case at hand, a device may be understood to be an electrical device, which processes sensor signals and outputs control and/or data signals as a function of them. The device may include an interface, which may take the form of hardware and/or software. In a hardware design, the interfaces may be, for example, part of a so-called system ASIC, which includes various functions of the device. However, it is also possible for the interfaces to be separate, integrated circuits or to be at least partially made up of discrete components. In a software design, the interfaces may be software modules that are present, for example, in a microcontroller, next to other software modules.

In addition, a vehicle is provided. According to an example embodiment of the present invention, the vehicle includes a device, which is configured to control and, additionally or alternatively, execute the steps of a specific embodiment of the methods described above. In addition, the vehicle has at least two passenger positions situated specularly symmetrically and includes the collision protection system. In this context, the first collision protection device and the second collision protection device are positioned specularly symmetrically.

According to the present invention, additionally advantageous, is a computer program product or computer program including program code, which may be stored in a machine-readable carrier or storage medium, such as a solid state memory, a hard disk storage device, or an optical storage device, and is used for performing, implementing and/or controlling the steps of the method according to one of the above-described specific embodiments, in particular, when the program product or program is executed on a computer or a device.

Exemplary embodiments of the approach put forward here are represented in the drawing and explained in greater detail in the following description.

DETAILED DESCRIPTION OF EXAMPLE EMBODIMENTS

In the following description of preferred exemplary embodiments of the present invention, the same or similar reference numerals are used for the elements that are shown in the different figures and function similarly, in which case a repeated description of these elements is omitted.

Figure 1:
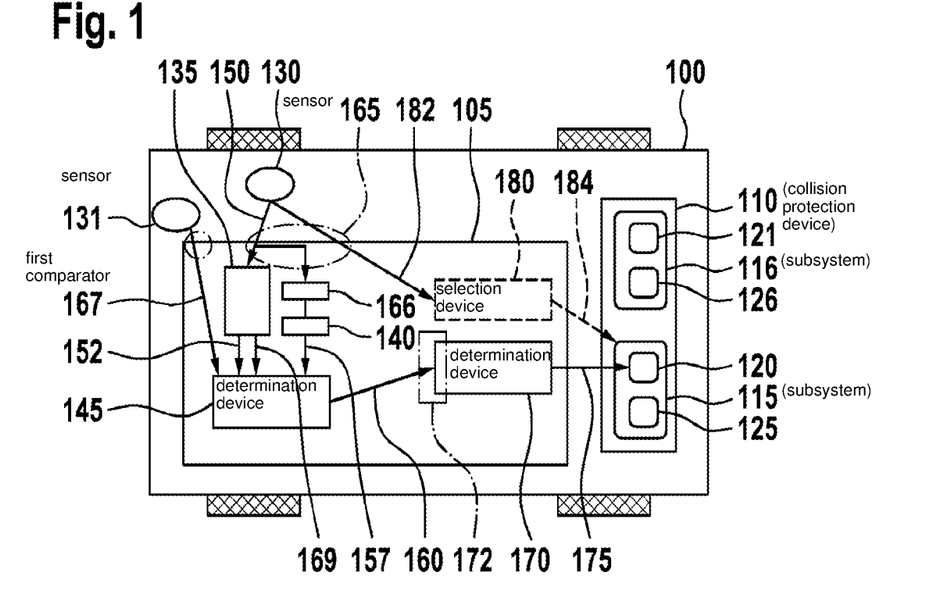
FIG. 1 shows a schematic representation of a vehicle, including a device according to an exemplary embodiment of the present invention.

FIG. 1 shows a schematic representation of a vehicle 100 including a device 105, according to an exemplary embodiment. Vehicle 100 includes a collision protection system 110 having here, by way of example, two subsystems 115, 116. Subsystems 115, 116 include first collision protection devices 120, 121, respectively, which are assigned to a first collision direction, and at least second collision protection devices 125, 126, respectively, which are assigned to a second collision direction. First collision protection device 120, 121 and second collision protection device 125, 125 are positioned specularly symmetrically to each other, e.g., in each instance, at different ends of vehicle 100, lying diametrically opposed to each other in a specularly symmetric manner. In addition, vehicle 100 includes at least two passenger positions situated specularly symmetrically, as shown illustratively in the following, using FIGS. 4 and 5. In this case, vehicle 100 further includes, by way of example, an acceleration sensor 130 and a peripheral sensor 131, for example, a distance sensor or a sensor situated in a region of vehicle 100 deformable in a collision, for example, a so-called "upfront sensor." Acceleration sensor 130 is, for example, a sensor, which is positioned centrally in vehicle 100, and by which accelerations associated with both the first collision direction and the second collision direction may be measured.

In addition, vehicle 100 includes device 105. Device 105 is configured to detect a collision direction of a vehicle 100. In addition, device 105 is configured to activate collision protection system 110 in response to a detected collision direction of vehicle 100.

In order to detect the collision direction of vehicle 100, device 105 includes a first comparator 135, a second comparator 140, and a determination device 145. First comparator 135 is configured to compare a first acceleration signal 150 to a first threshold value and to a second threshold value, in order to determine a first collision direction signal 152 indicating a direction of the collision. In this context, first acceleration signal 150 represents a longitudinal acceleration of vehicle 100. The first threshold value and the second threshold value have different algebraic signs, in order to be able to distinguish between two opposite directions of the collision. Second comparator 140 is configured to compare a second acceleration signal 155 to a further threshold value, in order to determine a further collision direction signal 157 that indicates a direction of the collision. Second acceleration signal 155 represents the acceleration of vehicle 100 subjected to smoothing. Determination device 145 is configured to determine a result signal 160, using first collision direction signal 152 and further collision direction signal 157. Result signal 160 indicates the direction indicated by first collision direction signal 152 and further collision direction signal 157 as an actual collision direction, if the direction of the collision of first collision direction signal 152 and the direction of the collision of further collision direction signal 157 match.

According to the exemplary embodiment shown here, device 105 is configured to read in first acceleration signal 150 via an interface 165 to acceleration sensor 130.

According to the exemplary embodiment shown here, device 105 additionally includes a smoothing device 166. Smoothing device 166 is configured to smooth first acceleration signal 150, using low-pass filtering, in order to ascertain second acceleration signal 155. As an alternative to that, device 105 may also be configured to read in second acceleration signal 155 via an interface 165 to acceleration sensor 130. In this case, acceleration sensor 130 is configured to provide the second acceleration signal 155 representing the smoothing of first acceleration signal 150.

In addition, device 105 is configured to repeatedly execute the comparison of first acceleration signal 150 with the first and second threshold values and the comparison of second acceleration signal 155 with the further threshold value, in order to supply first collision direction signal 152 and further collision direction signal 157, and configured to repeatedly execute the determination of result signal 160, in order to detect a change in the actual collision direction during the collision and to indicate it, using result signal 160.

According to an exemplary embodiment, determination device 145 is additionally configured to determine result signal 160, using, in addition, at least one sensor signal 167. Sensor signal 167 represents a signal provided by peripheral sensor 131 of vehicle 100. For example, sensor signal 167 may be used to additionally validate result signal 160.

According to the exemplary embodiment shown here, upon comparing first acceleration signal 150 to the first and second threshold values, first comparator 135 is additionally configured to determine a collision start signal 169, which represents a detected collision.

In order to activate collision protection system 110 in response to a detected collision direction, device 105 includes a further determination device 170 having a reading-in interface 172. Determination device 170 is configured to read in result signal 160 via reading-in interface 172. In addition, determination device 170 is configured to determine a control signal 175 for selectively activating first collision protection device 120 or second collision protection device 125, using result signal 160.

According to an exemplary embodiment, determination device 170 is additionally configured to determine the control signal 175 for activating first collision protection device 120, if result signal 160 indicates the first collision direction, and to activate second collision protection device 125, if result signal 160 indicates the second collision direction.

According to the exemplary embodiment shown here, device 105 further includes a selection device 180 for activating collision protection system 110. Selection device 180 is configured to select one of the subsystems 110, 115 having first collision protection devices 120, 121 and second collision protection devices 125, 126, respectively, using a third acceleration signal 182, which represents a magnitude of first acceleration signal 150. To that end, as shown here, third acceleration signal 182 is provided, for example, by acceleration sensor 130. A selection signal 184 is provided for activating one of the selected subsystems 110, 115. Subsystem 110, 115 is selected prior to or simultaneously to the determination of control signal 175.

Figure 2:
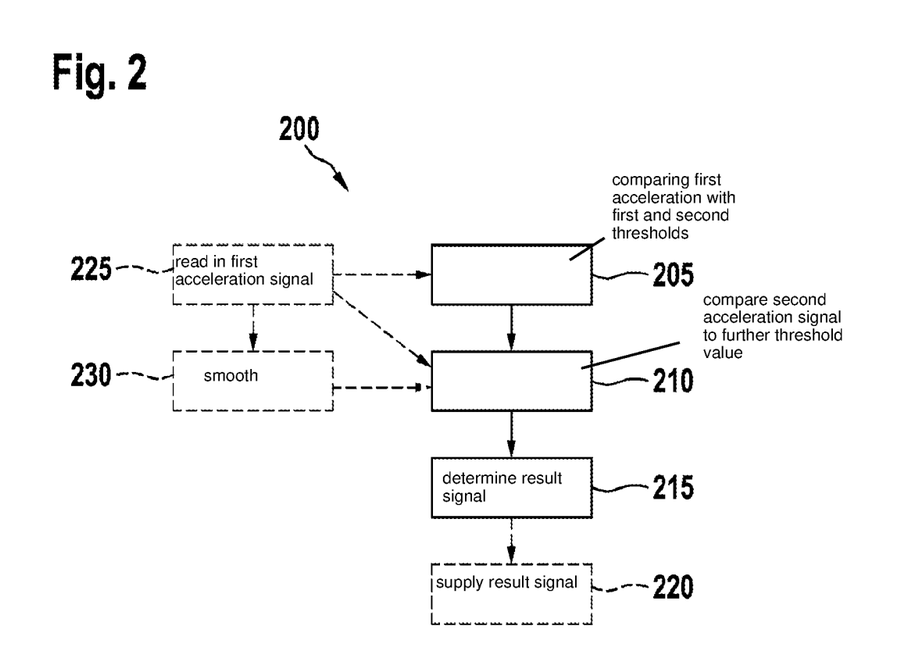
FIG. 2 shows a flow chart of a method for detecting a collision direction of a vehicle according to an exemplary embodiment of the present invention.

FIG. 2 shows a flow chart of a method 200 for detecting a collision direction of a vehicle according to an exemplary embodiment. Method 200 may be executed, using an exemplary embodiment of the device described above. Method 200 includes at least a step 205 of comparing a first acceleration signal, a step 210 of comparing a second acceleration signal, and a step 215 of determining a result signal.

In step 205, the first acceleration signal is compared to a first threshold value and to a second threshold value, in order to determine a first collision direction signal indicating a direction of the collision. The first acceleration signal represents a longitudinal acceleration of the vehicle. In addition, the first threshold value and the second threshold value have different algebraic signs, in order to be able to distinguish between two opposite directions of the collision.

In step 210, the second acceleration signal is compared to a further threshold value, in order to determine a further collision direction signal indicating a direction of the collision. The second acceleration signal represents the acceleration of the vehicle subjected to smoothing.

In determining step 215, the result signal is determined, using the first collision direction signal and the further collision direction signal. In this context, the result signal only indicates the direction indicated by the first collision direction signal and the further collision direction signal as an actual collision direction, if the direction of the collision of the first collision direction signal and the direction of the collision of the further collision direction signal match. In this manner, the result signal is prevented from indicating an incorrect collision direction due to a short-term backswing of the first acceleration signal, in which in some instances, both the first and the second threshold values are passed.

According to one exemplary embodiment of method 200, at least steps 205, 210, and 215 may be executed repeatedly, in order to detect a change in the actual collision direction during the collision and to indicate it, using the result signal.

According to an exemplary embodiment, the method additionally includes a step 220 of supplying the result signal via a single electrical line. Step 220 is optionally executable after determining step 215.

In addition, the method 200 according to the exemplary embodiment shown here includes a step 225 of reading in the first acceleration signal via an interface to an acceleration sensor. Step 225 may be executed prior to step 205. As an option, the second acceleration signal is also read in in reading-in step 225.

Furthermore, the method 200 according to the exemplary embodiment shown here includes an optional step 230 of smoothing the first acceleration signal, using low-pass filtering, in order to ascertain the second acceleration signal. Smoothing step 230 is optionally executable prior to step 210.

Figure 3:
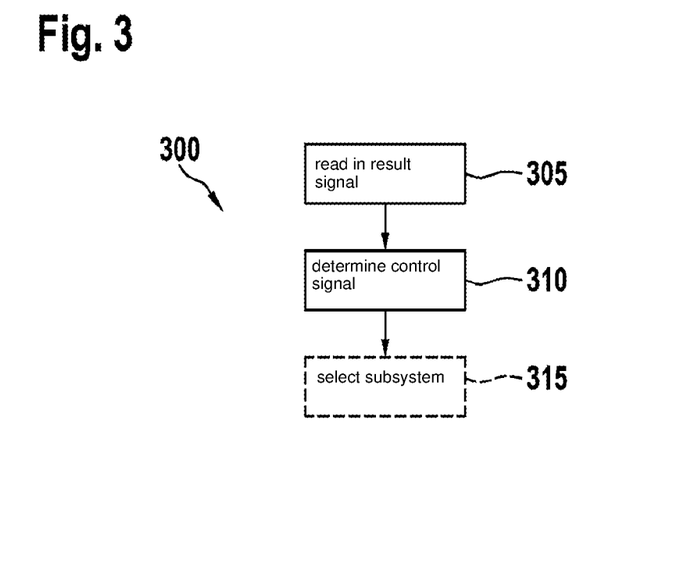
FIG. 3 shows a flow chart of a method for activating a collision protection system of a vehicle in response to a detected collision direction of the vehicle, according to an exemplary embodiment of the present invention.

FIG. 3 shows a flow chart of a method 300, according to an exemplary embodiment, for activating a collision protection system of a vehicle in response to a detected collision direction of the vehicle. Method 300 may be executed, using an exemplary embodiment of the device described above. In addition, method 300 is executable in connection with a vehicle, as is described above in light of FIG. 1. The collision protection system of the vehicle includes at least one subsystem having at least one first collision protection device assigned to a first collision direction and at least one second collision protection device assigned to a second collision direction.

Method 300 includes at least a step 305 of reading in a result signal and a step 310 of determining a control signal. In step 305, the result signal, which indicates the detected collision direction, is read in. In this context, the result signal is determined, using an exemplary embodiment of the above-described method for detecting a collision direction of a vehicle. In step 310, the control signal for selectively activating the first collision protection device or the second collision protection device is determined, using the result signal.

According to the exemplary embodiment shown here, method 300 additionally includes a selecting step 315. In step 315, the subsystem having the first collision protection device and the second collision production device is selected, using a third acceleration signal, which represents a magnitude of the first acceleration signal. The selecting step 315 is optionally carried out prior to or simultaneously to the determining step.

Figure 4:
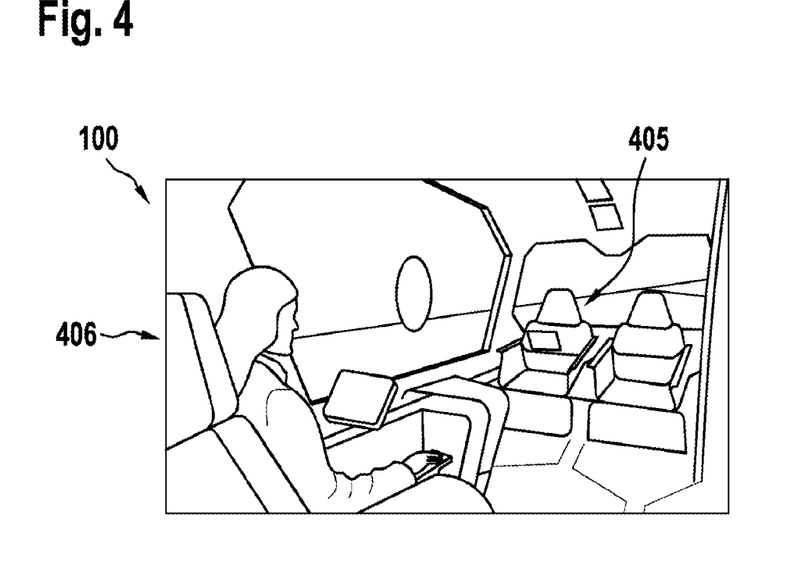
FIGS. 4 and 5 show, in each instance, an exemplary embodiment of a vehicle having occupant positions situated specularly symmetrically, according to the present invention.
Figure 5:
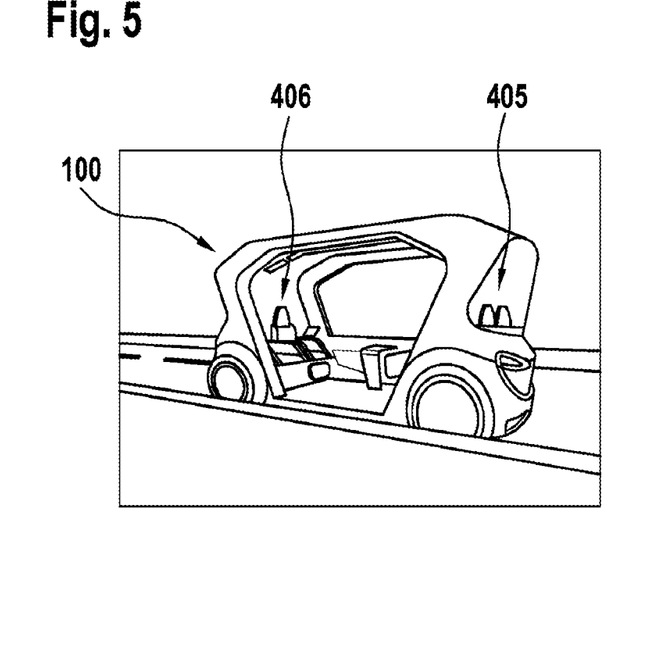

FIGS. 4 and 5 each show an exemplary embodiment of a vehicle 100 having passenger positions 405, 406 situated specularly symmetrically. The device and method described in light of the preceding figures may be used in connection with a vehicle, such as the vehicle 100 shown in FIGS. 4 and 5. In this context, it is advantageous that none of the two longitudinal collision directions is favored in the event of a collision. By way of example, a robotaxi is shown here as vehicle 100. In contrast to conventional passenger cars, all of the passengers sit in the direction of view of the middle of the vehicle. In each of the two figures in question, specularly symmetric placement of seats in vehicle 100 and, therefore, of passenger positions 405, 406, is shown. In this context, the seats are situated oppositely to each other; passengers of the specific seats of the passenger positions 405, 406 shown here sitting directly opposite to each other, with the orientation of the seat in the direction of the middle of the vehicle. Accordingly, unlike in the case of sitting positions in conventional vehicles, in which all of the passengers sit facing the direction of travel, a head-on crash, in which the bodies of the passengers may be displaced forwards out of the seats, is not a more critical scenario than a rear-end crash.

Accordingly, in the approach described here, a head-on crash and rear-end crash may be treated the same, for example, using one and the same triggering circuit. Thus, it is not necessary for the detection and triggering algorithm for the head-on crash to have a more complex structure and to be more complex to calculate than for a vehicle having conventional sitting positions. Accordingly, the triggering algorithms for the head-on crash and the rear-end crash may be designed identically, or only one triggering algorithm may be used, which is responsible for both the head-on crash and the rear-end crash. Thus, the algorithm for a rear-end crash has the same structure as the head-on crash, since due to the symmetric seat positioning, it is not ensured that the passengers are already prevented from being positionally displaced to the back by the seat. Thus, the triggering of further restraining devices (e.g., belt tensioners) contributes markedly to the safety of the passengers in both rear-end crashes and head-on crashes. Consequently, the temporal requirements of the algorithm are identical for the head-on crash and the rear-end crash, as well.

Since the signal processing for the types of crashes to be treated identically may be designed to be highly complex, e.g., with regard to the signal filtering or signal integration, only having to provide one algorithm and allowing it to process ("either-or approach") conserves resources, depending on the type of the crash at hand. This is also technically acceptable, since the central x-acceleration represents the force, which acts upon the passengers and differs in algebraic sign as a function of the crash direction.

In the case of consecutive crashes (combination crashes) having a different direction (that is, e.g., a head-on crash followed by a rear-end crash, or vice versa), a remaining challenge of the either-or approach is the changing of the decision as to the direction, which is to be considered in the activation of protection devices.

On the basis of the equal risk of injury in head-on crashes and rear-end crashes due to the symmetric seat positioning, the "switchover decision rule" is symmetric. This means that with regard to computations associated with the front-end crash, the switchover of the processing of the algorithm to computations associated with the rear-end crash should take place just as rapidly as in the opposite case, that is, with the same combination of crashes, but in a different order.

Vehicles, such as the vehicle 100 shown here, so-called robotaxis, are currently being developed in the automotive branch; the vehicles being designed, for example, as autonomously traveling vehicles, in which passengers sit facing each other in a specularly symmetric manner, as in the case of the passenger positions 405, 406 shown here. If two passengers are in opposite sitting positions, in this case, with a direction of view towards the middle of the vehicle, that is, in each instance, only one with a direction of view in the current direction of travel, then a crash at one end of the vehicle is perceived by one passenger as head-on crash, in which the passenger is displaced forwards, and by the other as a rear-end crash, in which he/she is pressed into the seat. For this reason, a separate rear-end crash algorithm becomes unnecessary for such vehicles. In this case, the use of the device and method described above is advantageous for the substantially identical detection of crashes at both ends of the vehicle.

For vehicles 100 having passenger positions 405, 406 situated specularly symmetrically, as well as restraint systems, a uniform crash detection algorithm, which is for collisions at both ends of the vehicle and is controlled by a dynamic crash direction detection unit, as described in light of the above figures, is advantageous. In this context, a dynamic crash detection unit, in which both the current crash direction is detected and a "switchover decision rule" for combination crashes is provided, is advantageously possible. According to an exemplary embodiment described above, this is rendered possible by the detection of a change in the collision direction. In addition, none of the two ends of the vehicle is favored during the activation and the selection of the collision protection devices, but the end of the vehicle is ascertained symmetrically, since due to the passenger positions 405, 406, the collision directions are substantially identical with regard to forward displacement of the passengers. In comparison with a separate calculation of two head-on crash algorithms (in which each end of the vehicle is viewed as the front), this is, for example, advantageous with regard to software resources, which may be conserved, since algorithmically identical method instructions (source code) only have to be saved once in the control unit and the same calculations only have to be executed once. This allows the use of control units having lower computing power, and it reduces costs.

In contrast to a static crash direction detection unit, which identifies, for example, only collisions in the direction of travel as relevant, or which retains a crash direction detected once until the end of the collision, a dynamic crash direction detection unit, as described here, allows advantageous detection in complex combination crashes for vehicles having symmetrical passenger positions 405, 406, as well, e.g., in robotaxis. In this context, in particular, detecting the change in collision direction and taking into account the detected change in direction in the activation of collision protection devices, as described above, is advantageous. In comparison with a classic, asymmetric switchover decision rule, in which a change from direction 1 to direction 2 takes place more rapidly than from direction 2 to direction 1, and consequently, a changed triggering performance results in response to a reversed crash sequence, the dynamic crash direction detection described here permits symmetric and balanced treatment of crashes at both ends of the vehicle, even in combination crashes.

The device described in light of FIG. 1 is configured to implement such dynamic detection of the crash direction, and subsequently, to activate collision protection devices on the basis of the detected collision direction. As shown in the following in light of FIG. 11, an algorithm forming the basis of it and/or signal processing forming the basis of it correspondingly includes the dynamic crash direction detection, as well as a uniform crash detection algorithm, which is used for evaluation of crashes from the two (longitudinal) directions. Based on the result of the crash direction detection, the inputs into the uniform crash detection algorithm are selected, and the relevant restraining devices for the specific direction are selected. In this context, the entire detection acts symmetrically with regard to the crash direction. In contrast to a crash detection algorithm, which allows only static detection of the crash direction (that is, without change to the direction decision), a dynamic approach allows technically superior performance in complex collision situations that include multiple crashes (combination crashes), in particular, in the case of the specularly symmetric passenger positions 405, 406 shown.

In addition, a symmetric direction decision including a symmetric switchover decision rule allows an equivalent detection performance for each crash direction in complex collision situations, e.g., in the case of two consecutive crashes at different ends of the vehicle.

A further advantage is the reduction of software resources, since required signals (e.g., filters or integrals) for the decision to trigger restraining devices having a crash direction detection unit connected in incoming circuit are calculated only once, unlike in the case of triggering and crash detection algorithms for each end of the vehicle, which are independent of each other.

Figure 6:
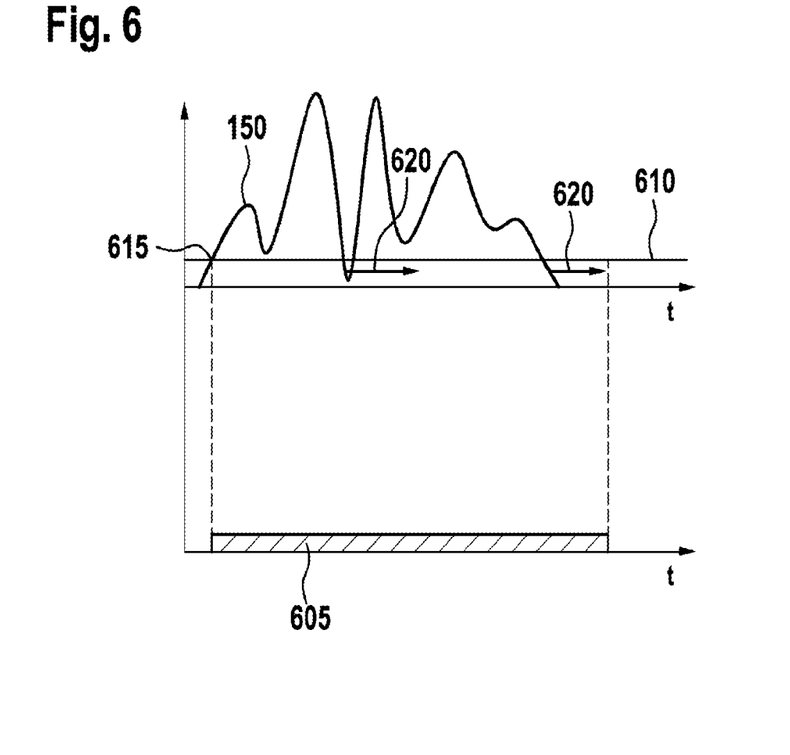
FIG. 6 shows a representation of a time characteristic of a first acceleration signal according to an exemplary embodiment, according to the present invention.

FIG. 6 shows a plot of a time characteristic of a first acceleration signal 150, according to an exemplary embodiment. The characteristic of first acceleration signal 150 is shown in a coordinate system, in which a period of time t is plotted on the abscissa and a magnitude of a longitudinal acceleration of a vehicle is plotted on the ordinate. In this case, first acceleration signal 150 shows an acceleration in a first direction. A longitudinal acceleration of the vehicle in a second direction is subsequently shown by FIG. 7. In addition, a time frame 605 of a detected collision is marked. Furthermore, a first threshold value 610, to which first acceleration signal 150 is compared, is marked. At a time 615 highlighted here, a value of first acceleration signal 150 exceeds first threshold value 610 for the first time. In this case, time 615 corresponds to a starting time of time frame 605 of the detected collision.

According to an exemplary embodiment, the first collision direction signal determined upon comparison of first acceleration signal 150 with first threshold value 610 and with the second threshold value has a similar hysteresis 620 regardless of the direction of the collision. In this case, hysteresis 620 is shown by two arrows as a particular period of time, in which a downswing of first acceleration signal 150 within the particular time frame of the hysteresis 620 remains without an effect on the detected collision direction. In each instance, a period of time of hysteresis 620 begins, when first acceleration signal 150 falls below first threshold value 610. If the value of acceleration signal 150 remains below first threshold value 610 beyond the time frame of hysteresis 620, then this results in a change of the detected collision direction.

In the following, the description given here is explained again in different words: The detection of the collision direction takes place symmetrically with respect to two ends of the vehicle. Thus, in the following, the two ends of the vehicle are called "Front1" and "Front2." A necessary, primary condition for the detection of the start of a crash is shown in the present figure: If first acceleration signal 150 exceeds first threshold value 610, also called "DetectionThd_F1," then the necessary criterion for detecting the start of the crash at Front1 is satisfied. Accordingly, time frame 605 of the detected collision also marks the period of time, in which the primary condition for Front1 is satisfied. In this context, the basis for the detection is first acceleration signal 150, which is a processed, for example, lowpass-filtered, signal that is based on the central x-acceleration (that is, along the longitudinal axis of the vehicle), the longitudinal acceleration of the vehicle. In order to increase the robustness of detection, after first-time nonfulfillment, this primary condition continues to be considered as "satisfied" for a certain time, for the designated time frame of hysteresis 620. This prevents unnecessary segmentation of a single crash event into a plurality of time segments.

In order to determine the collision direction signal, the first acceleration signal is compared not only to first threshold value 610, but also to a second threshold value. This is shown subsequently by FIG. 7.

Figure 7:
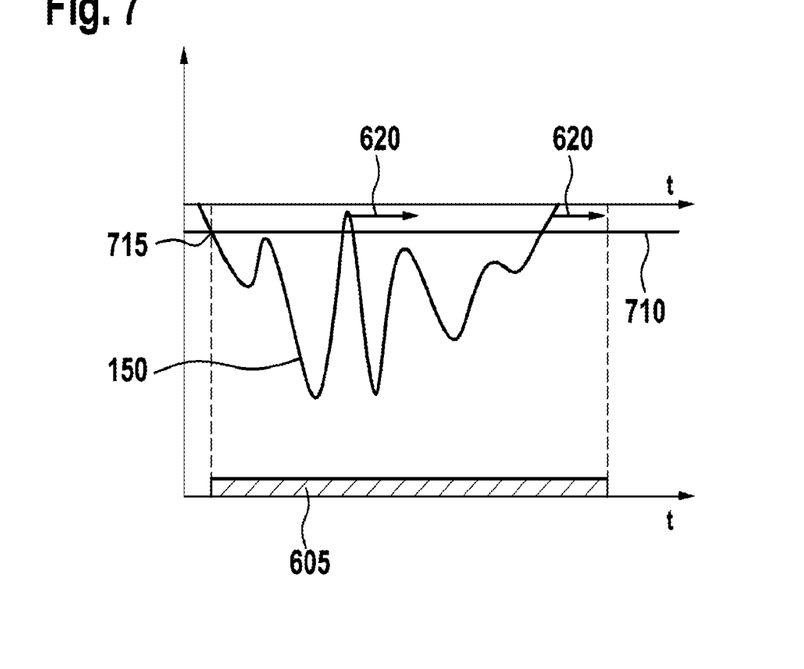
FIG. 7 shows a representation of a time characteristic of a first acceleration signal according to an exemplary embodiment of the present invention.

FIG. 7 shows a plot of a time characteristic of a first acceleration signal 150, according to an exemplary embodiment. In this case, as well, the characteristic of first acceleration signal 150 is shown in a coordinate system, in which a period of time t is plotted on the abscissa and a magnitude of a longitudinal acceleration of a vehicle is plotted on the ordinate. In contrast to FIG. 6, the characteristic of first acceleration signal 150 is, in this case, an acceleration of the vehicle in a second direction. Here, time frame 605 of a detected collision is marked, as well. In addition, a second threshold value 710 is shown, to which the first acceleration signal is compared for determining the first collision direction signal. At a time 715 highlighted here, a value of first acceleration signal 150 falls below second threshold value 710 for the first time. In this case, time 715 corresponds to a starting time of time frame 605 of the detected collision.

Here, hysteresis 620 is marked by two arrows, as well: An upswing of first acceleration signal 150 within the particular period of time of hysteresis 620 remains without an effect on the detected start of the collision and the detected collision direction, whereas the result of exceedance of second threshold value 710 beyond the period of time of hysteresis 620 is that an end of the collision is detected and/or a change in the collision direction is possible.

In this connection, if first acceleration signal 150 is determined to have exceeded the first threshold value and fallen below second threshold value 710, then this allows not only the start of the crash to be detected at time 715, as shown in the two figures, but also the collision direction to be detected. In this context, the primary condition to detect the crash direction is, for Front1, for the processed x-acceleration signal, first acceleration signal 150, to exceed DetectionThd_F1, the first threshold value; and, for Front2, for the first acceleration signal to fall below DetectionThd_F2, the second threshold value 710. In this instance, as shown here, after the primary condition is, for the first time, not satisfied for a particular period of time due to hysteresis 620, it continues to be deemed satisfied.

In summary, FIGS. 6 and 7 show the necessary, primary condition for detecting the start of a crash: Acceleration signal 150 exceeds the first threshold value, the threshold DetectionThd_F1, as shown by FIG. 6; or analogously, for Front2, when first acceleration signal 150 falls below negative threshold DetectionThd_F2 (that is, exceeds it in magnitude).

Figure 8:
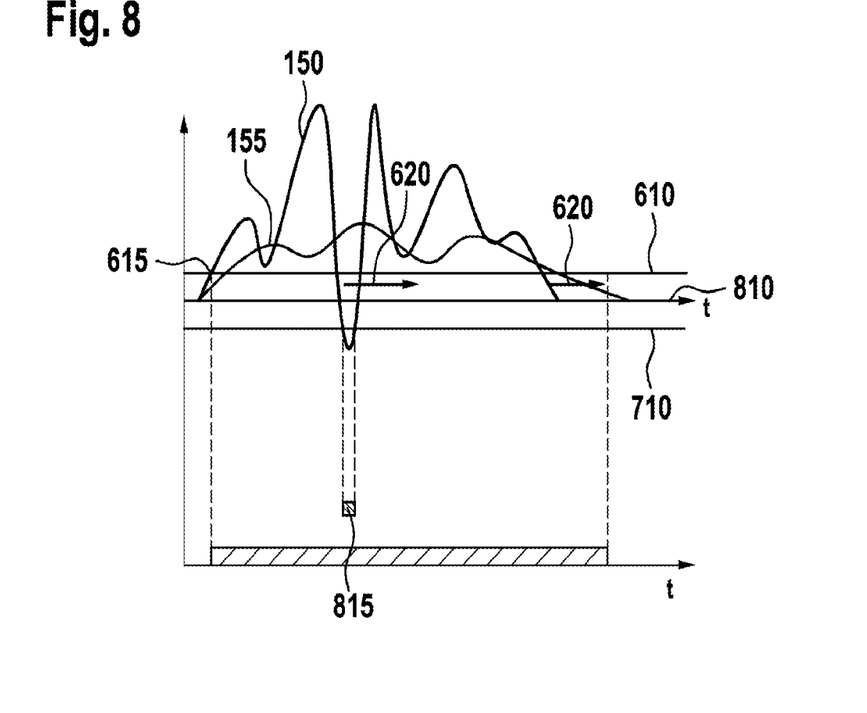
FIG. 8 shows a representation of a time characteristic of a first acceleration signal and a second acceleration signal according to an exemplary embodiment of the present invention.

FIG. 8 shows a plot of a time characteristic of a first acceleration signal 150 and a second acceleration signal 155 according to an exemplary embodiment. First acceleration signal 150 and the second acceleration signal are shown in a coordinate system, in which a period of time t is plotted on the abscissa and a magnitude of a longitudinal acceleration of the vehicle in the first direction is plotted on the ordinate, in a manner similar to FIG. 6.

Here, except for a short time interval, which lies within the period of time of hysteresis 620, first acceleration signal 150 exceeds first threshold value 610. In this case, second acceleration signal 155, which is subjected to smoothing and represents the acceleration of the vehicle, continuously exceeds a further threshold value 810. Here, further threshold value 810 corresponds to zero and is therefore designated by the abscissa. However, it may also represent a value other than zero.

In a time interval 815 marked here, first acceleration signal 150 falls below not only first threshold value 610, but also further threshold value 810 and second threshold value 710. In time interval 815, the primary condition for a detected collision at Front2 is satisfied for a short time, due to the second threshold value's 710 being undershot. However, the secondary condition is not satisfied: The direction of the collision, which is indicated by the collision direction signal determined in the comparison of first acceleration signal 150 with first threshold value 610 and with second threshold value 710, is only considered to be the actual collision direction, if it matches the direction of the collision determined in the comparison of second acceleration signal 155 with further threshold value 810. This is not fulfilled here, since second acceleration signal 155 does not fall below the further threshold value in time interval 815, but exceeds it. Accordingly, the short-term downswing of first acceleration signal 150 below second threshold value 710 is not misinterpreted; a change in the collision direction is not detected.

In other words, a secondary condition is necessary, in order to solve the problem of ambivalence in interpretation in the case of sharp oscillations in the measured acceleration signal: In the present figure, as well as in the following FIG. 9, it is shown, by way of example, how, during a crash at one end of a vehicle (e.g., Front1), the processed, central x-acceleration, first acceleration signal 150, temporarily satisfies the threshold condition for the opposite end of the vehicle (e.g., Front2). Accordingly, the direction of the collision determined with the aid of the comparison of first acceleration signal 150 with first threshold value 610 and with second threshold value 710 is not solely sufficient for determining the actual collision direction. The start of a crash and the direction of a crash are only detected, when the primary and secondary conditions for detecting the start of a collision for Front1 and Front2 are satisfied.

In situations, in which the two primary conditions are satisfied, that is, in which first acceleration signal 150 both exceeds first threshold value 610 and falls below second threshold value 710, the fulfillment of the secondary condition for detecting the actual crash direction is the deciding factor: Second acceleration signal 155, which is also based on the central x-acceleration, but is processed in such a manner, that it has a stronger low-pass characteristic than first acceleration signal 150, must be taken into account for this. Second acceleration signal 155 is only used for satisfying the secondary condition, since a strong low-pass characteristic is possibly accompanied by a signal delay, as well. In the simplest case, the secondary condition is regarded as satisfied for a crash direction, if the algebraic sign of second acceleration signal 155 (x-acceleration having a strong low-pass characteristic) matches the algebraic sign of threshold value 610, 710 (DetectionThd_F1 or DetectionThd_F2) of the primary condition, the comparison with first acceleration signal 150. Thus, as a secondary condition in response to interpretational ambivalence in the case of sharply oscillating signals, agreement of the direction of the collision determined by the comparison of first acceleration signal 150 with first threshold value 610 and with second threshold value 710, with the direction determined by the comparison of second acceleration signal 155 with further threshold value 810, is advantageous for robust and dynamic detection of the actual collision direction. Thus, a crash at the one end of the vehicle (Front1/Front2), whose primary and secondary conditions are simultaneously satisfied, is finally considered to be detected.

In complex combination crash situations, in which a Front1 crash transitions directly into a Front2 crash, or vice versa, the secondary condition will also change from Front1 to Front2 within a brief period of time. This allows a dynamic switchover from crash direction Front1 to Front2 and/or from Front2 to Front1 in such crash scenarios.

Figure 9:
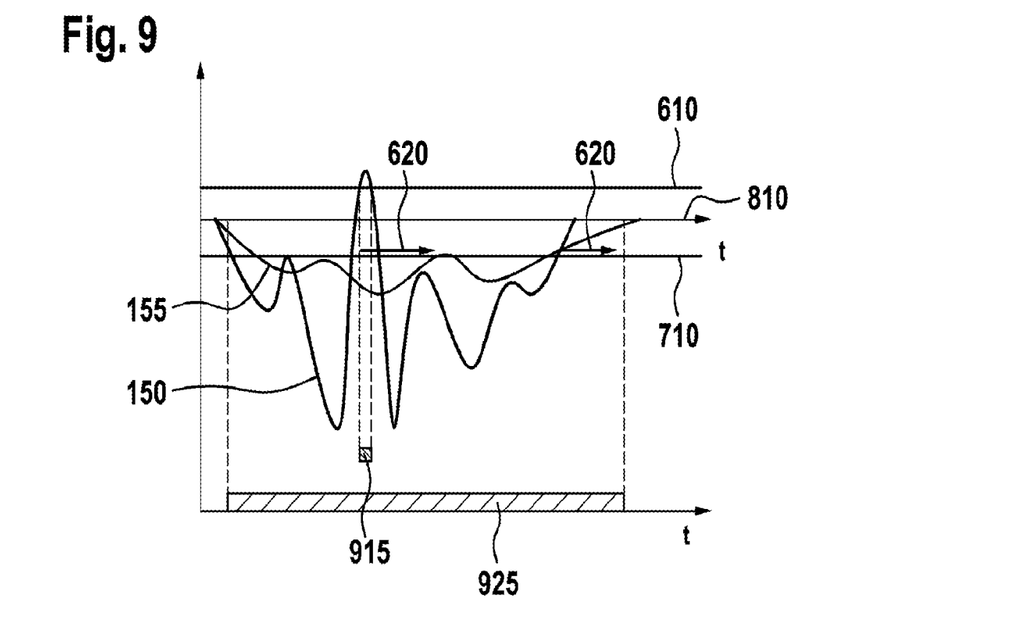
FIG. 9 shows a representation of a time characteristic of a first acceleration signal and of a second acceleration signal according to an exemplary embodiment of the present invention.

FIG. 9 shows a plot of a time characteristic of a first acceleration signal 150 and a second acceleration signal 155 according to an exemplary embodiment. First acceleration signal 150 and the second acceleration signal are shown in a coordinate system, in which a period of time t is plotted on the abscissa and a magnitude of a longitudinal acceleration of the vehicle in the second direction is plotted on the ordinate, in a manner similar to FIG. 7. A situation comparable to the situation described by FIG. 8 is shown: In this case, except for a short time interval 915, which lies within the period of time of hysteresis 620, first acceleration signal 150 falls below first threshold value 610 and second threshold value 710. In this instance, second acceleration signal 155 continuously falls below further threshold value 810, which is also designated here by the abscissa. Accordingly, in this case, with the exception of time interval 915, in which the first acceleration signal exceeds second threshold value 710 and first threshold value 610 temporarily, the collision in the second direction is detected by comparing first acceleration signal 150 to first threshold value 610 and to second threshold value 710. In this case, as well, second acceleration signal 155 continuously falls below further threshold value 810, which means that the secondary condition is satisfied over an entire time frame 925 of the detected collision in the second direction. Accordingly, it is also shown here that, the fulfillment of both the primary condition and the secondary condition is advantageous for reliably detecting a collision for Front1 and Front2 and for detecting the crash direction.

Figure 10:
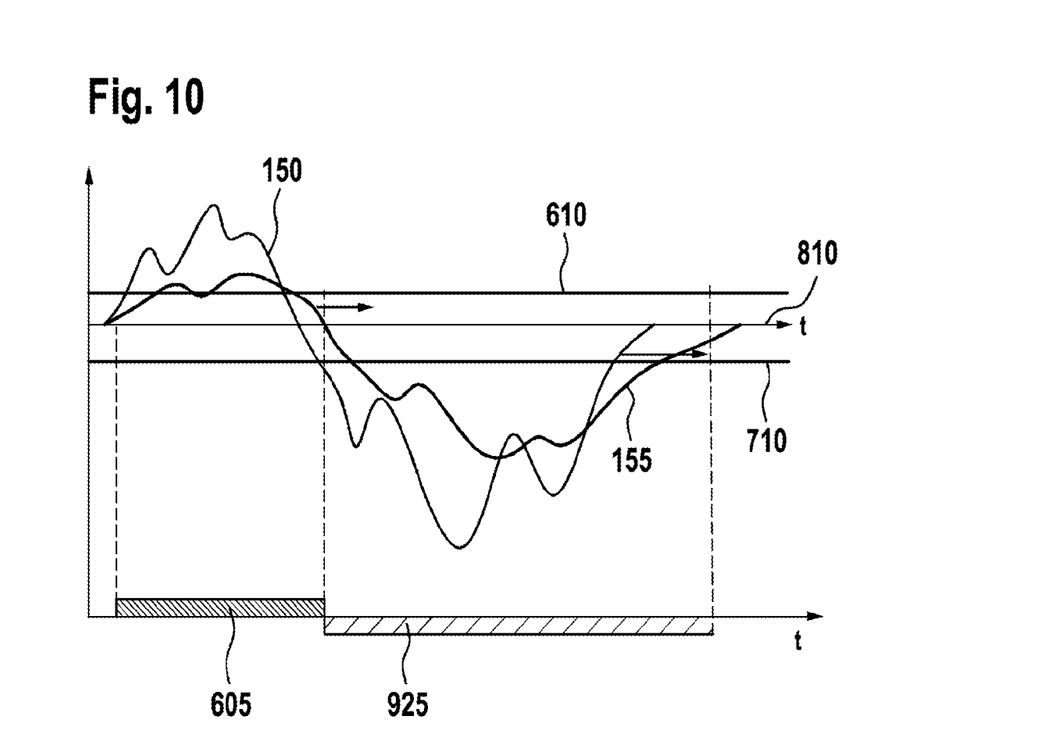
FIG. 10 shows a representation of a time characteristic of a first acceleration signal and of a second acceleration signal in the case of a change in the collision direction, according to an exemplary embodiment of the present invention.

FIG. 10 shows a plot of a time characteristic of a first acceleration signal 150 and a second acceleration signal 155 in the case of a change in the collision direction, according to an exemplary embodiment. In time frame 605, in which second acceleration signal 155 continuously exceeds further threshold value 810, and in which first acceleration signal 150 continuously exceeds first threshold value 610, with a brief time interval of hysteresis 620 shortly before the change in collision direction, the first direction of the acceleration is detected as the actual collision direction. The change in direction of the collision then occurs, which is marked here by the end of time frame 605 of the detected, first collision direction and the beginning of time frame 925 of the detected, second collision direction. After the change in the collision direction, in time frame 925 of the detected, second collision direction, second acceleration signal 155 falls below further threshold value 810 correspondingly continuously, and first acceleration signal 155 falls below second threshold value 710 continuously, except for the time interval of hysteresis 620 at the end of time frame 925 of the detected collision in the second direction.

Accordingly, in the figure in question here, a switchover of the crash direction detection from Front1 to Front2 in a combination crash is shown. In the example shown here, a variant is shown, in which the secondary condition only has to be satisfied, if the primary condition for Front1 and Front2 is simultaneously satisfied (interpretational ambivalence). In this variant, the secondary condition is satisfied, if the algebraic sign of the lowpass-filtered x-acceleration, second acceleration signal 155, matches that of the processed x-acceleration, first acceleration signal 150.

As an alternative to that, it is also possible to only use the secondary condition for the ultimate crash direction decision, if the primary condition is satisfied both for Front1 and for Front2. If this is not the case, then the primary condition is considered to be sufficient for deciding about the crash direction. It is also possible to use threshold values other than zero for further threshold value 810, and therefore, for the secondary condition. Furthermore, in addition to, or as an alternative to the comparison of second acceleration signal 155 with further threshold value 810, it is also possible to use features formed from sensor signals of peripheral sensors as a secondary condition. For example, it is possible to compare features of the upfront sensors assigned to crash direction "Front1" to those of upfront sensors assigned to crash direction "Front2", e.g., by subtraction. This processed differential signal shows positive values in the Front1 crash and negative values in the Front2 crash and then constitutes the secondary condition for the direction decision. In addition, in place of a logical combination of the secondary condition and primary condition, an adaptive primary condition controlled by the secondary condition is also possible; that is, it is possible to dynamically influence first threshold value 610, DetectionThd_F1, and second threshold value 710, DetectionThd_F2, in their values. If, for example, the further (markedly lowpass-filtered) x-signal, second acceleration signal 155, points in the Front1 direction, the magnitude of the starting threshold for Front2 crashes (DetectionThd_F2), second threshold value 710, may then be increased and, consequently, hinder the start in the Front2 direction. Because of the negative algebraic signs of Front2 collisions, the increase in magnitude corresponds to a sharper reduction of threshold DetectionThd_F2 in the negative range. It is also possible to develop this increase in magnitude continuously as a function of the value of second acceleration signal 155. The threshold levels of the primary detection thresholds may also be adapted in a completely analogous manner to first threshold value 610, DetectionThd_F1, and second threshold value 710, DetectionThd_F2, as a function of the above-described upfront differential signal.

Figure 11:
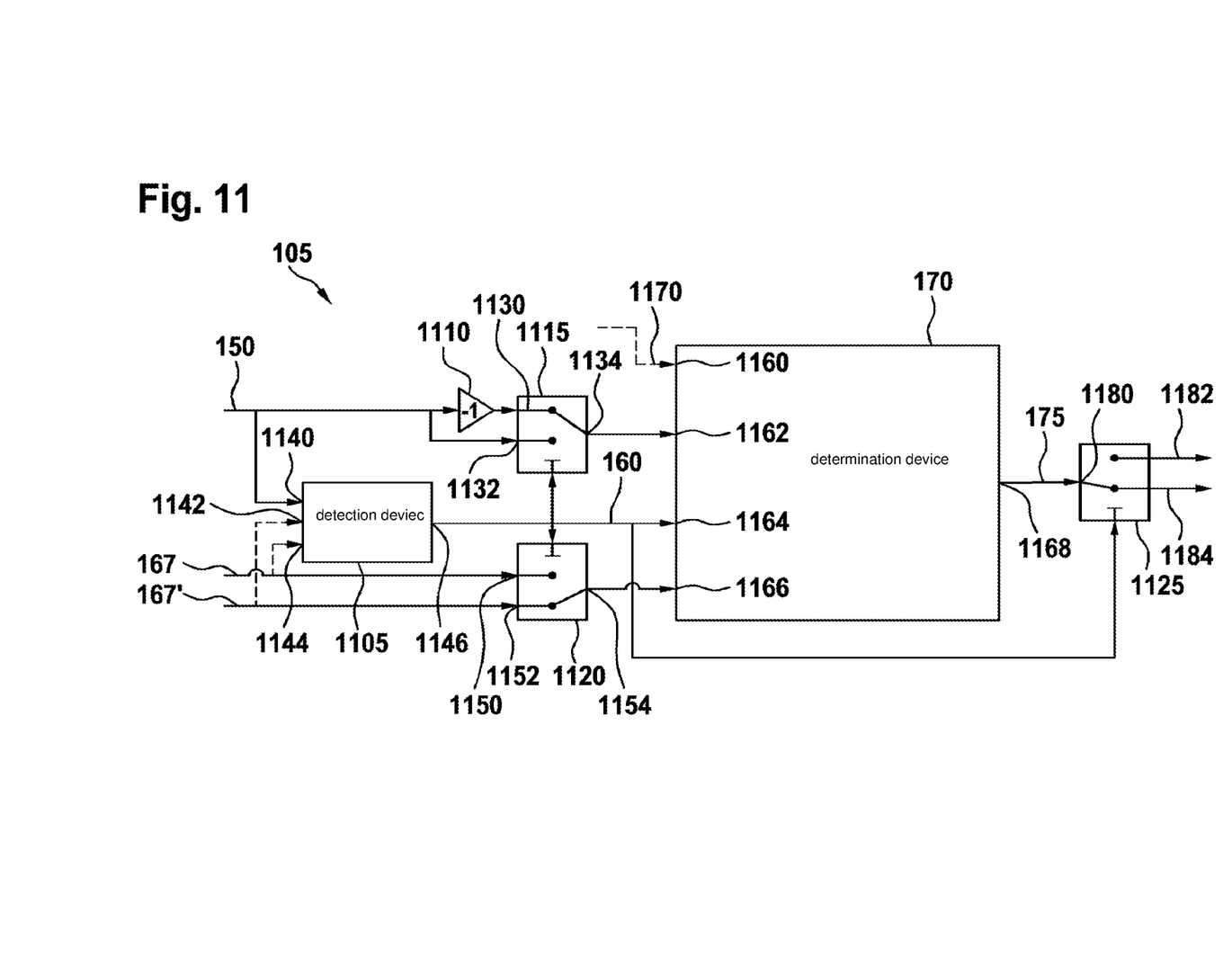
FIG. 11 shows a block diagram of a device according to an exemplary embodiment of the present invention.

FIG. 11 shows a block diagram of a device 105 according to an exemplary embodiment. The signals and components of device 105 shown here are similar to or correspond to the variants described in light of previous figures. In the present figure, interaction of the crash direction detection unit and the uniform crash detection algorithm is shown in view of an example of signal processing for detecting the collision direction. In this context, it is of primary importance that a uniform crash detection algorithm for the two crash directions Front1 and Front2 is used. Changes with regard to the detected crash direction are only made in the selection of the input signals of this algorithm, as well as in the selection of the appropriate restraining devices.

Here, device 105 includes, by way of example, a detection device 1105, which has the first comparator 135, second comparator 140, and determination device 145 described with the aid of FIG. 1, for determining result signal 160 and, correspondingly, result signal 160. According to the exemplary embodiment shown here, result signal 160 is supplied via a single electrical line. In addition, device 105 includes an inverter 1110; a first switch 1115; a second switch 1120; the determination device 170 described with the aid of FIG. 1, for determining control signal 175; and a third switch 1125.

First switch 1115 includes a first input 1130, a second input 1132, and an output 1134. First acceleration signal 150 is applied to first input 1130 of first switch 1115 via inverter 1110, and is applied directly to second input 1132, bypassing inverter 1110. Using the result signal 160 supplied by detection device 1105, the gate terminal of first switch 1115 connects first input 1130 or second input 1132 to output 1134. When result signal 160 indicates that first acceleration signal 150 has a positive algebraic sign, second input 1132 is set to the output, and when first acceleration signal 150 has a negative algebraic sign, first input 1130 is set to the output, as shown here by way of example.

In this case, detection device 1105 includes a first input 1140, a second input 1142, a third input 1144, and an output 1146. First acceleration signal 150 is applied to detection device 1105 via first input 1140. Sensor signal 167, which is provided, for example, by a peripheral acceleration sensor for Front1, is applied to detection device 1105 via second input 1142; and a further sensor signal 167, which is provided, for example, by a peripheral acceleration sensor for Front2, is applied to detection device 1105 via third input 1144. Using input signals 150, 167, 167', the determination of result signal 160 is carried out by detection device 1105, and result signal 160 is supplied via output 1146.

Second switch 1120 includes a first input 1150, a second input 1152, and an output 1154. Sensor signal 167 is applied to first input 1150, and further sensor signal 167' is applied to second input 1152. Using result signal 160, gate terminal of second switch 1120 connects first input 1150 or second input 1152 to output 1154. If result signal 160 indicates a detected collision at Front1, then first input 1150 is connected to output 1154, and if result signal 160 indicates a detected collision at Front2, then second input 1152 is connected to output 1154, as shown here by way of example.

In this case, the determination device 170 for determining control signal 175 includes, by way of example, a first input 1160, a second input 1162, a third input 1164, a fourth input 1166, and an output 1168. A vehicle sensor signal 1170 is applied to determination device 170 via first input 1160. Vehicle sensor signal 1170 is supplied, for example, by a radar sensor device or a pressure sensor device. The output signal of first switch 1115, the first acceleration signal 150, which indicates here, by way of example, a positive longitudinal acceleration, is applied to determination device 170. The output signal of detection device 1105, the result signal 160 having the crash direction information, is applied to determination device 170 via third input 1164, and the output signal of second switch 1120, the further sensor signal 167' acquired by peripheral acceleration sensors, is applied to determination device 170 via fourth input 1166. Control signal 175 supplied by determination device 170 via output 1168 is determined, using above-mentioned input signals 1170, 150, 160, 167. Control signal 175 is determined in accordance with a determination rule, such as the "front crash algorithm," which is described above and is substantially identical for Front1 and Front2 of the vehicle. In order to supply firing commands for restraining devices, control signal 175 is determined (generically) and supplied to third switch 1125 via output 1168.

Third switch 1125 includes an input 1180, as well as a first output 1182 and a second output 1184. Control signal 175 is applied to third switch 1125 via input 1180.

Using result signal 160, the gate terminal of third switch 1125 connects input 1180 to first output 1182, in order to output control signal 175 for outputting firing commands for Front1 restraining devices; or, as shown here by way of example, the gate terminal of the third switch connects the input to second output 1184, in order to output control signal 175 for outputting firing commands for Front2 restraining devices.

In the following, an example of an application is explained again in different words: First of all, appropriate input signals are selected for the uniform crash detection algorithm. Sensors placed centrally in the vehicle are evaluated by the crash detection algorithm in both Front1 and Front2 crashes. To this end, the sensor signals are normalized to the detected crash direction. This applies, in particular, to the x-signal in the centrally installed airbag control unit, but also to other sensors, which are attached symmetrically with respect to the longitudinal direction of the vehicle, for example on the B-pillar, and which measure in the longitudinal direction.

However, of the sensors attached asymmetrically (with respect to the longitudinal direction of the vehicle), such as the upfront sensors installed at the specific ends of the vehicle, only the ones that are situated in the matching crash direction are relevant. Thus, in this case, the appropriate upfront sensors are selected on the basis of the detected crash direction.

For the activation of the appropriate restraining devices, the firing decisions of the crash detection algorithm are possibly combined again with the crash direction detection, so that only the restraining devices assigned to the direction Front1 and/or Front2 are activated. For example, the firing decision, "airbag," is only intended to result in the firing of the airbags for passengers oriented, that is, looking, in the crash direction. On the other hand, the firing decision, "belt tensioner," is advantageously used for firing all of the belt tensioners, in order to fix, consequently, the passengers sitting opposite to the crash direction in position, as well.

Depending on the embodiment of the crash detection algorithm, it is also necessary to reset certain internal variables and memory elements of the algorithm, when the crash direction changes. For this reason, the crash direction detection also constitutes, for example, an input into the crash detection algorithm, as is shown in light of the present figure.

What is claimed is:

1. A method for detecting a direction of a collision of a vehicle, the method comprising the following steps:

comparing a first acceleration signal to a first threshold value and to a second threshold value, to determine a first collision direction signal indicating a direction of the collision, the first acceleration signal representing a longitudinal acceleration of the vehicle, and the first threshold value and the second threshold value having different algebraic signs to be able to distinguish between two opposite directions of the collision;

comparing a second acceleration signal to a further threshold value, to determine a further collision direction signal indicating the direction of the collision; the second acceleration signal representing an acceleration of the vehicle subjected to smoothing; and determining a result signal, using the first collision direction signal and the further collision direction signal, the result signal indicating the direction indicated by the first collision direction signal and by the further collision direction signal as an actual collision direction, when the direction of the collision of the first collision direction signal and the direction of the collision of the further collision direction signal match.

2. The method as recited in claim 1, further comprising supplying the result signal via a single electrical line.

3. The method as recited in claim 1, further comprising repeatedly executing the steps of the method, to detect a change in the actual collision direction during the collision and to indicate it, using the result signal.

4. The method as recited in claim 1, further comprising reading in the first acceleration signal via an interface to an acceleration sensor.

5. The method as recited in claim 4, wherein in the reading-in step, the second acceleration signal is additionally read in, or wherein the method further includes smoothing the first acceleration signal, using low-pass filtering, to ascertain the second acceleration signal.

6. The method as recited in claim 1, wherein in the step of comparing the first acceleration signal, the first collision direction signal has a similar hysteresis irrespective of the direction of the collision.

7. The method as recited in claim 6, wherein in the step of comparing the first acceleration signal, a period of time of the hysteresis is started, when a magnitude of the first acceleration signal falls below the first threshold value or the second threshold value, and is not started, when the magnitude of the first acceleration signal exceeds the first threshold value or the second threshold value.

8. The method as recited in claim 1, wherein in the determining step, the result signal is determined, using, in addition, at least one sensor signal, the sensor signal representing a signal supplied by a peripheral sensor of the vehicle.

9. The method as recited in claim 1, wherein in the step of comparing the first acceleration signal to the first threshold value and to the second threshold value, a collision start signal, which represents a detected collision, is also determined.

10. A method for activating a collision protection system of a vehicle in response to a detected collision direction of the vehicle, the collision protection system including at least one subsystem having at least one first collision protection device assigned to a first collision direction and at least one second collision protection device assigned to a second collision direction, the method comprising the following steps:

reading in a result signal, which indicates the detected collision direction, the result signal being determined by:

comparing a first acceleration signal to a first threshold value and to a second threshold value, to determine a first collision direction signal indicating a direction of the collision, the first acceleration signal representing a longitudinal acceleration of the vehicle, and the first threshold value and the second threshold value having different algebraic signs to be able to distinguish between two opposite directions of the collision, comparing a second acceleration signal to a further threshold value, to determine a further collision direction signal indicating the direction of the collision; the second acceleration signal representing an acceleration of the vehicle subjected to smoothing, and determining the result signal, using the first collision direction signal and the further collision direction signal, the result signal indicating the direction indicated by the first collision direction signal and by the further collision direction signal as an actual collision direction, when the direction of the collision of the first collision direction signal and the direction of the collision of the further collision direction signal match; and determining a control signal for selectively activating the first collision protection device or the second collision protection device, the control signal being determined using the result signal.

11. The method as recited in claim 10, wherein in the determining step, the control signal is determined for activating the first collision protection device when the result signal indicates the first collision direction, and the control signal is determined for activating the second collision protection device when the result signal indicates the second collision direction.

12. The method as recited in claim 10, further comprising selecting the subsystem having the first collision protection device and the second collision protection device, using a third acceleration signal, which represents a magnitude of the first acceleration signal, the selecting step being executed prior to or simultaneously to the determining step.

13. A device configured to detect a direction of a collision of a vehicle, the device configured to:
compare a first acceleration signal to a first threshold value and to a second threshold value, to determine a first collision direction signal indicating a direction of the collision, the first acceleration signal representing a longitudinal acceleration of the vehicle, and the first threshold value and the second threshold value having different algebraic signs to be able to distinguish between two opposite directions of the collision;
compare a second acceleration signal to a further threshold value, to determine a further collision direction signal indicating the direction of the collision; the second acceleration signal representing an acceleration of the vehicle subjected to smoothing; and
determine a result signal, using the first collision direction signal and the further collision direction signal, the result signal indicating the direction indicated by the first collision direction signal and by the further collision direction signal as an actual collision direction, when the direction of the collision of the first collision direction signal and the direction of the collision of the further collision direction signal match.

14. A vehicle, comprising:
a device configured to activate a collision protection system of a vehicle in response to a detected collision direction of the vehicle, the collision protection system including at least one subsystem having at least one first collision protection device assigned to a first collision direction and at least one second collision protection device assigned to a second collision direction, the device configured to:
read in a result signal, which indicates the detected collision direction, the result signal being determined by:
comparing a first acceleration signal to a first threshold value and to a second threshold value, to determine a first collision direction signal indicating a direction of the collision, the first acceleration signal representing a longitudinal acceleration of the vehicle, and the first threshold value and the second threshold value having different algebraic signs to be able to distinguish between two opposite directions of the collision,
comparing a second acceleration signal to a further threshold value, to determine a further collision direction signal indicating the direction of the collision; the second acceleration signal representing an acceleration of the vehicle subjected to smoothing, and
determining a result signal, using the first collision direction signal and the further collision direction signal, the result signal indicating the direction indicated by the first collision direction signal and by the further collision direction signal as an actual collision direction, when the direction of the collision of the first collision direction signal and the direction of the collision of the further collision direction signal match, and
determine a control signal for selectively activating the first collision protection device or the second collision protection device, the control signal being determined using the result signal; and
at least two passenger positions situated specularly symmetrically;
wherein the first collision protection device and the second collision protection device being positioned specularly symmetrically.

15. A non-transitory computer-readable medium on which is stored a computer program for activating a collision protection system of a vehicle in response to a detected collision direction of the vehicle, the collision protection system including at least one subsystem having at least one first collision protection device assigned to a first collision direction and at least one second collision protection device assigned to a second collision direction, the computer program, when executed by a computer, causing the computer to perform the following steps:
reading in a result signal, which indicates the detected collision direction, the result signal being determined by:
comparing a first acceleration signal to a first threshold value and to a second threshold value, to determine a first collision direction signal indicating a direction of the collision, the first acceleration signal representing a longitudinal acceleration of the vehicle, and the first threshold value and the second threshold value having different algebraic signs to be able to distinguish between two opposite directions of the collision,
comparing a second acceleration signal to a further threshold value, to determine a further collision direction signal indicating the direction of the collision; the second acceleration signal representing an acceleration of the vehicle subjected to smoothing, and determining the result signal, using the first collision direction signal and the further collision direction signal, the result signal indicating the direction indicated by the first collision direction signal and by the further collision direction signal as an actual collision direction, when the direction of the collision of the first collision direction signal and the direction of the collision of the further collision direction signal match; and determining a control signal for selectively activating the first collision protection device or the second collision protection device, the control signal being determined using the result signal.

\* \* \* \* \*